United States Patent
Kruger

(10) Patent No.: US 12,502,650 B2
(45) Date of Patent: Dec. 23, 2025

(54) CALCINATION PROCESS

(71) Applicant: Origen Power Ltd, West Midlands (GB)

(72) Inventor: Tim Kruger, West Midlands (GB)

(73) Assignee: ORIGEN POWER LTD (GB)

( * ) Notice: Subject to any disclaimer, the term of this patent is extended or adjusted under 35 U.S.C. 154(b) by 704 days.

(21) Appl. No.: 17/799,334

(22) PCT Filed: Feb. 11, 2021

(86) PCT No.: PCT/GB2021/050315
§ 371 (c)(1),
(2) Date: Aug. 12, 2022

(87) PCT Pub. No.: WO2021/161021
PCT Pub. Date: Aug. 19, 2021

(65) Prior Publication Data
US 2023/0142046 A1 May 11, 2023

(30) Foreign Application Priority Data
Feb. 13, 2020 (GB) .................................... 2001957

(51) Int. Cl.
*B01J 6/00* (2006.01)
*B01D 53/047* (2006.01)
(Continued)

(52) U.S. Cl.
CPC ............ *B01J 6/001* (2013.01); *B01D 53/343* (2013.01); *C01F 5/06* (2013.01); *C01F 11/06* (2013.01);
(Continued)

(58) Field of Classification Search
None
See application file for complete search history.

(56) References Cited

U.S. PATENT DOCUMENTS

| 3,630,504 A | * | 12/1971 | Reynolds | ................. | C04B 2/04 |
| | | | | | 423/640 |
| 4,373,454 A | | 2/1983 | Pitrolo et al. | | |
| 2014/0305353 A1 | | 10/2014 | Bunger et al. | | |

FOREIGN PATENT DOCUMENTS

CN 104174280 A * 12/2014
CN 110394026 A * 11/2019
(Continued)

OTHER PUBLICATIONS

W.J. Thomson, "DXRD Studies of Oil Shale Mineral Reactions", Energy & Fuels, 1988, 2, 9-13 (Year: 1988).*
(Continued)

*Primary Examiner* — Michael Forrest
*Assistant Examiner* — Nicole Lee Quist
(74) *Attorney, Agent, or Firm* — Sunstein LLP

(57) ABSTRACT

Described is the use of a mineral comprising a metal carbonate fraction and a fuel fraction, such as oil shale or coal shale, in a calcination process. The disclosed process can advantageously result in carbon dioxide being removed from the atmosphere. Further, in the process, heat energy generated during calcination can be used to separate oxygen from air, so that the oxygen can be fed back into the system. Alternatively or in addition, heat energy may also be used to compress the gaseous carbon dioxide generated from the calcination process.

17 Claims, 1 Drawing Sheet

(51) Int. Cl.
  *B01D 53/34*   (2006.01)
  *C01F 5/06*    (2006.01)
  *C01F 11/06*   (2006.01)
(52) U.S. Cl.
  CPC ........ *B01D 53/047* (2013.01); *B01D 2256/12* (2013.01); *B01D 2256/22* (2013.01)

(56) References Cited

FOREIGN PATENT DOCUMENTS

EP      3444319 A1   2/2019
IL        51676 A    5/1977

OTHER PUBLICATIONS

Loo et al, "Experimental analysis of the combustion characteristics of Estonian oil shale in air and oxy-fuel atmospheres", Fuel Processing Technology, 2015, 134, 317-324 (Year: 2015).*
Suat Ozturk, "Effects of CO2, H2O and N2 dilutions on emission characteristics and partially premixed combustion of shale gas", International Journal of Engineering and Advanced Technology, 2019, 8 6 , 4440-4446 (Year: 2019).*
European Patent Office, International Search Report for PCT/GB2021/050315, May 7, 2021, 3 pages.
Astolfi, Marco et al., "Improved flexibility and economics of Calcium Looping power plants by thermochemical energy storage", International Journal of Greenhouse Gas Control, vol. 83, Feb. 22, 2019, pp. 140-155.

* cited by examiner

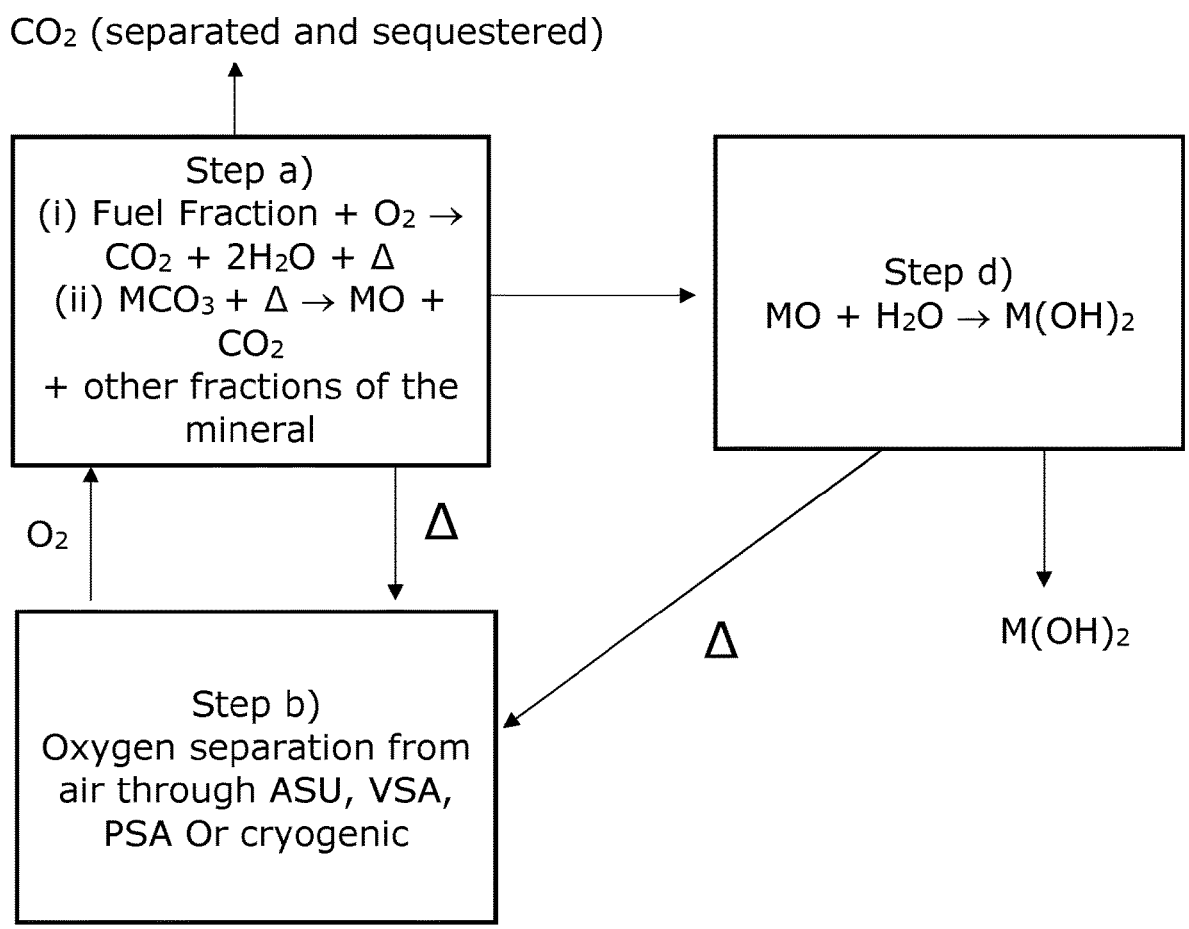

CALCINATION PROCESS

CROSS-REFERENCE TO RELATED APPLICATIONS

This application is a national phase entry of International Patent Application No. PCT/GB2021/050315 filed Feb. 11, 2021, which claims priority to United Kingdom Patent Application No. GB2001957.6 filed Feb. 13, 2020. Each of the above-described applications is incorporated herein by reference in its entirety.

The invention relates to the use of a mineral comprising a metal carbonate fraction and a fuel fraction, such as oil shale or coal shale, in a calcination process. The process of the invention can advantageously result in carbon dioxide being removed from the atmosphere. Further, the invention relates to a process where heat energy generated during calcination can be used to either separate oxygen from air, so that the oxygen can be fed back into the system, or used to compress the gaseous carbon dioxide generated from the calcination process as part of a sequestration process.

BACKGROUND

Notwithstanding the awareness of issues such as global warming, and the limited natural resources available, there is still a huge demand for industrial processes which rely on these resources. In order to meet this demand, and simultaneously combat climate change, there is a need for more technological innovation in the energy sector, in particular in the development of carbon neutral industrial processes.

Calcination is an important industrial process because it generates metal oxides, which are extremely versatile and can be used across a wide range of different applications, such as cement and concrete manufacture, catalysis, water purification and thermal insulation. However, the calcination of metal oxides is a major cause of greenhouse gas emissions. For instance, in the calcination of limestone ($CaCO_3$) to produce lime (CaO), the carbon dioxide produced is often simply released to the atmosphere. It has been estimated that limestone calcination alone contributes to around 5% of global carbon dioxide emissions, equating to around 1.5 billion tonnes of emissions per annum. Usually, limestone is calcined in a lime kiln by the combustion of natural gas in air. The natural gas reacts with the oxygen in the air, generating heat which is used to raise the temperature in the kiln to a sufficiently high temperature to cause the limestone to calcine. However, this process results in the production of a flue gas, which is a mixture containing carbon dioxide and a high proportion of nitrogen. Sequestration of this carbon dioxide requires the separation of carbon dioxide from other flue gases, especially nitrogen. This additional purification step is both energy-intensive and costly. As a result, sequestration is often not attempted at all. Artificial processes have been developed for the capture and sequestration of industrial carbon dioxide. For example, carbon sequestration has been used to create a carbon neutral calcination process (EP 3 027 713 B1). However, the calcination process described requires the use of fuel cells, which are expensive to manufacture. As such, it would be advantageous to provide a calcination method in which the carbon dioxide produced could be captured and if appropriate, sequestered without the need for complex equipment or processing of the carbon dioxide.

The present inventor has proposed in unpublished British patent application number 1904480.9 a calcination process in which carbon dioxide can be sequestered, which does not involve a fuel cell. This relates to a closed-loop process comprising the steps of: a) calcination of a metal carbonate by combustion of a fuel in the presence of a mixture of oxygen, water vapour and carbon dioxide, to generate a metal oxide, water vapour, carbon dioxide and heat; b) using the heat generated to drive an oxygen generation reaction; and c) using the oxygen generated in step b) in calcination step a).

This process has many advantages, but uses a high value fuel, such as natural gas, and a pure mineral such as calcium carbonate.

The invention is intended to overcome or ameliorate at least some aspects of the above problems.

SUMMARY OF INVENTION

Accordingly, in a first aspect of the invention there is provided a process as defined in claim 1 comprising the following steps:
  a) providing a mineral comprising a metal carbonate fraction and a fuel fraction, wherein the fuel fraction has a calorific value which is at least 50% of the energy needed to calcine the metal carbonate fraction, and combusting the mineral in the presence of oxygen, water vapour and carbon dioxide, to generate a metal oxide, water vapour, carbon dioxide and heat;
  b) using heat generated in step a) to:
    i) drive a gas separation process which generates high purity oxygen from air, wherein oxygen generated is used in step a); and/or
    ii) compress the carbon dioxide generated in step a).

There are many minerals which contain both a metal carbonate fraction and a fuel fraction. Common examples are oil shale and coal shale, which are sedimentary rocks containing a mixture of organic material and minerals including carbonate materials. The organic material is kerogen, which is a solid mixture of organic chemical compounds. Kerogen is the precursor to oil. The carbonate materials usually include calcium carbonate and magnesium carbonate.

Conventionally oil shale has been used to produce oil by pyrolysis (applying extreme heat in the absence of oxygen). However, this is an expensive process, and not generally economically viable.

It is possible to burn oil shale as it is, but the heat generated is low because burning the kerogen results in the (exothermic) decomposition of the carbonates. Accordingly, only those deposits with a very high proportion of organic material are economically viable to process, and only when the oil price is comparatively high.

However, with traditional oil reserves dwindling, oil shale makes up a significant potential resource, especially in the United States, which is home to the Green River Formation in Wyoming, Utah and Colorado. This is thought to account for about 80% of oil shale reserves globally. The Green River Formation has within it 3 trillion barrels-worth of oil. However, this resource, along with numerous other deposits, are not economically viable under current hydrocarbon extraction processes.

The system of the present invention can utilise this fossil energy, thereby restoring value to numerous mineral deposits including the Green River Formation. Furthermore, the present invention surprisingly allows this type of mineral to be processed in a way that can result in the net removal of carbon dioxide from the atmosphere.

Were all the oil shale in the Green River Formation to be extracted conventionally and combusted it would result in emissions of about 1 trillion tonnes of carbon dioxide, sufficient to increase global temperatures by a further 1° C. Using the process of the present invention, with the carbon dioxide sequestered and the calcium carbonate and magnesium oxide allowed to recarbonate, it could restore the level of carbon dioxide in the atmosphere to pre-industrial levels. This is clearly of huge global significance.

In conventional calcination processes (such as in a lime kiln), a fuel is generally burned in air. The flue gas from such a reaction typically comprises a large proportion of nitrogen, making separation from the flue gases of conventional calcination both costly and energy-intensive. By minimising the amount of nitrogen during combustion, it has surprisingly been found that the process of the present invention can be used to produce high-purity carbon dioxide, which can be directly sequestered. The heat energy can also be recycled to generate high-purity oxygen, with the need for only minimal electricity, resulting in both an energetically and economically valuable process.

Further, in conventional calcination processes, a high grade fuel, such as natural gas, is used to calcinate a pure metal carbonate, such as calcium carbonate. In the present invention, a low grade fuel source, namely a mineral such as oil shale is used as both the fuel and metal carbonate in step a) which is simultaneous both a combustion reaction and calcination reaction.

Minerals such as oil shale and coal shale are considered to be only marginally economic, or indeed uneconomic, as fuel sources and are of low value. The present invention allows these materials to be utilised as a substitute for natural gas in a calcination process, with the fuel fraction providing most, if not all, the heat for the calcination reaction to take place.

When the process of the present invention is combined with carbon dioxide sequestering, the process is carbon neutral. The resultant metal oxide product can be used for re-carbonation, or as an additional component in cement production, being similar in nature to blast furnace slags and coal fly ash (from power boilers). When the resultant metal oxides, such as calcium oxide and magnesium oxide, are allowed to recarbonate with carbon dioxide, the process is carbon-negative.

DETAILED DESCRIPTION

Step a) of the present invention involves combusting a mineral comprising a metal carbonate fraction and a fuel fraction, wherein the fuel fraction has a calorific value which is at least 50% of the energy needed to calcine the metal carbonate fraction. By this we mean that energy released on combustion of the mineral, which will be as a result of the fuel fraction, should provide at least half the energy needed to drive the calcination reaction. By calcination reaction we mean decomposition of the metal carbonate present in the mineral to metal oxide.

Any mineral that has a metal carbonate fraction and a fuel fraction can be used in the invention, provided that there is enough energy in the fuel to calcine at least half of the carbonate fraction. Where there isn't enough energy to calcine the whole carbonate fraction, an additional fuel source can be added in step a). In a preferred embodiment of the invention, the calorific value associated with the fuel fraction of the mineral is sufficiently high to enable to calcination of the entire carbonate fraction. This means that an additional fuel is not required.

To make the invention viable, the mineral preferably has a significant carbonate fraction of at least 20% by weight, and a significant fuel fraction, also of at least 20% by weight of the total mineral. The mineral will generally contain other elements, for example silicates, alumina and iron oxide. It is preferred that the carbonate and fuel fractions together make up at least 50%, preferably at least 60%, 70%, 80% or 90% by weight of the mineral as a whole.

Typically, the mineral comprises group II metal carbonates, or bicarbonates, preferably including magnesium carbonate, calcium carbonate, dolomite or combinations thereof. The mineral often also comprises silicates and other inorganic components.

The most common minerals that are suitable for use in the present invention are oil shale or coal shale. Reference to "shale" should be taken to mean oil shale and/or coal shale, as distinct from other carbonaceous materials such as "coal". As noted above, by oil shale or coal shale, we mean a sedimentary rock containing a mixture of carbonaceous material (i.e. fuel fraction) and minerals including carbonate materials. There is no fixed chemical formula for shale, it is a complex mixture formed naturally by the decomposition of organic matter. The carbonaceous material is kerogen, which is a solid mixture of organic chemical compounds. Kerogen is the precursor to oil. The carbonate materials usually include calcium carbonate and magnesium carbonate. Shales contain a significant proportion of clay minerals, for example silica, alumina and iron oxide as well as calcium and magnesium oxides. For the present invention, it is preferred to use 'black' shales which generally contain more than 1% by weight of organic material, preferably more than 20% of organic material. In contrast, "fuel coals" generally comprise extremely low levels of carbonate however, it is important that such materials are present in only trace amounts when using these fuels in conventional combustion processes. For instance, when using traditional coal or oil as a fuel to generate power, the fuel fraction of the coal or oil must have a high calorific value. The greater the amount of carbonate material present, the lower this calorific value will be, meaning that such a fuel would be considered unsuitable for traditional fuel combustion processes. Therefore, "fuel coal" or "fuel oil" (generally referred to in the literature simply as "coal" or "oil") has a significantly lower level of carbonate materials compared to the levels present in shale. This is not only because the presence of carbonate reduces the absolute levels of combustible material present, as described above, but also because, on combusting a material with high levels of carbonate, some of the calorific value of the material would be consumed by calcining the carbonates. In conventional combustion processes, if traditional coal or oil contained a high proportion of carbonates it would reduce the energy density of fuel and increase the quantity of ash that would need to be disposed of. Therefore, such a fuel would have a higher carbon footprint (which is already notoriously high when carbonates are present in trace amounts) as there would be emissions from both the combustion of the coal, and from the calcination of the carbonates. As such, it is clear that for the purposes of the invention the shale of the invention is distinct from traditional coals or oils.

In a preferred embodiment, oil shale is used in the present invention. The present invention is particularly well suited to processing oil shale from the Green River Formation.

In step a), a mixture of oxygen, water vapour and carbon dioxide is used, in which the mineral is combusted. Typically the mixture comprises 5 to 20% by volume water vapour, 15 to 25% by volume oxygen and 60 to 75% by volume carbon dioxide.

Accordingly, the oxygen is at a similar level to in air, but instead of nitrogen as the main diluent, carbon dioxide and water vapour are used, which means that the carbon dioxide is much easier to sequester than if it has to be separated from a high level of nitrogen.

There will inevitable be some nitrogen entering the combustion chamber in step a), but this is preferably at most 5%, preferably at most 1% by volume of the total gases. Other gases, such as argon may also be present at levels of less than 2, preferably less than 1% by volume of the total.

This is beneficial, as combustion in pure oxygen generates a combusted gas that is hotter than that required for the calcination reaction. The presence of water vapour and carbon dioxide as diluents stabilise the combustion process to meet the requirements of the calcination reaction temperature ranges. Moreover, if the flame temperature is too high, it may reduce the lifetime of combustion apparatus. In addition, if the calcination temperature i.e. the temperature of step a) is too high, then the resulting metal oxide may sinter, resulting in low reactivity, which would make it unsuitable for many markets.

By using carbon dioxide and/or steam or flue gases as the diluent, the product gas stream of the calcination reaction is not contaminated. Further, the carbon dioxide and/or flue gases produced in the reaction can be recycled from step a) for use as the diluent, removing the need for, and cost of, a separate diluent.

In a preferred embodiment, a portion of the flue gasses from step a) are recycled and mixed with high purity oxygen to form the mixture for step a). The flue gases typically comprise 80-90% carbon dioxide, 10-20% water vapour, <1% nitrogen, <1% oxygen and <2% argon.

The oxygen in step a) is usually sourced from purified air. Air entering the system can be purified in a gas separation process which generates high purity oxygen from air as per step b), discussed below, and separated into two streams: a stream that comprises predominantly nitrogen, and a stream that comprises predominantly oxygen. The stream comprising oxygen could then be used as the oxygen source for calcination step a).

Water vapour is also present in step a) either from air, or from the recycled flue gasses from step a). The introduction of water vapour into the calcination unit serves three main purposes:

(i) As is the case with carbon dioxide, the water vapour can act as a non-reactive diluent to lower the flame temperature of combustion. In conventional lime kilns, this diluent function is provided by nitrogen, but, as mentioned previously, the disadvantage of using nitrogen as a diluent is that it has to be separated from the flue gas if pure carbon dioxide is required. This separation process is costly and difficult. When mixed with water vapour, the extraction of carbon dioxide is simple to achieve by cooling the mixture of gases to a point at which the water vapour condenses to liquid water.

(ii) Water vapour also serves to reduce the partial pressure of carbon dioxide in the gas mixture at the point of calcination. Le Chatelier's Principle indicates that a higher partial pressure of one of the products of the calcination reaction (namely carbon dioxide) will act to inhibit the reaction. The introduction of a proportion of water vapour into the gas mixture can act to restrict the partial pressure of carbon dioxide and thereby reduce the extent of this inhibition.

(iii) Further, the presence of water vapour has been shown to have a catalytic effect on the kinetics of the calcination of calcium carbonate, resulting in a lower temperature at which the calcination reaction occurs. This results in a reduction in the cost and energy requirements of the calcination reaction.

Before the mineral is combusted in step a) of the invention, it is usually milled before being fed into a combustion chamber, usually using a roller or ball mill. The resulting size would be in a range from 10 microns to 120 microns, with a typical Gaussian distribution. Milling or grinding may result in the release of some volatile organic compounds, which can be economically recovered, or alternatively also combusted in step a). Accordingly, the process of providing the oil or coal shale or other mineral may result in the additional advantage of valuable volatile organic compounds which can be collected and used elsewhere.

The mineral is then ignited and burns in the mixture of oxygen, water vapour and carbon dioxide. Typically the mineral is preheated in a preheater by the combusted flue gases that have been recycled from step a) to a temperature where the fuel fraction will spontaneously ignite (typically in a range of 400-800° C., depending on the nature on the fuel fraction) before being moved into the main combustion chamber where it is ignited. The fuel fraction is an organic material which, on heating, can convert to hydrocarbons and combust to produce carbon dioxide, water, and heat. The heat produced by the combustion drives a calcination reaction in the carbonate fraction, in which a metal carbonate is changed to metal oxide and carbon dioxide. Accordingly, in a simplified and idealistic way step a) of the process can also be expressed as follows:

a)

$$C_nH_{2n+2} + aO_2 \rightarrow bCO_2 + cH_2O + \Delta \quad \text{(i)}$$

$$MCO_3 + \Delta \rightarrow MO + CO_2 \quad \text{(ii)}$$

Where n may be an integer from 1 to 5; a, b and c are integers; M is a metal as described in detail below; and $\Delta$ represents heat. a, b and c may follow the relationship a=1.5n+0.5, b=n, c=n+1 where often n=1. As the mineral is a complex product, and is likely to contain unsaturated hydrocarbons and other compounds, the reactions will not be this simplistic, and these are given only as an illustration.

Therefore, the gaseous products of the combustion reaction of the fuel fraction of the mineral (i) and resulting calcination reaction of the carbonate fraction (ii) comprise primarily carbon dioxide and water vapour. This provides an easily purified and reutilisable product stream that can be separated from the solid products with ease.

The gas may then be cooled, and some or all (often only a proportion) may be mixed with high-purity oxygen, for use in step a). As described above, the benefit of this is that the carbon dioxide and water vapour acts as diluents, reducing the flame temperature of combustion; the water vapour present reduces the partial pressure of carbon dioxide, which subsequently reduces the inhibitory affect carbon dioxide would otherwise have on calcination; and the reintroduction of water vapour also acts catalytically to increase the kinetics of the calcination reaction.

As described above, step a) is a calcination reaction, wherein the metal carbonate fraction of the mineral is calcined (i.e. heated to a sufficient temperature such that it thermally decomposes) to a metal oxide and carbon dioxide by the heat generated by the combustion of the fuel fraction of the shale in the presence of a mixture of carbon dioxide, water vapour and oxygen. Combustion is an exothermic reaction, and the heat energy generated from the combustion should be sufficiently high to calcine the metal carbonate fraction. If there is not sufficient energy in the fuel fraction of the mineral, a further fuel, such as natural gas, can be added. Step a) of the process claimed takes place in a furnace, kiln, calciner or the like, often in a kiln. Before the combustion, the mineral is preheated in a preheater, which can be an integral to or separate from the calciner or kiln.

It should be noted that, as used herein, references to the energies required to drive a reaction, or which is released from a reaction, as cited in kJmol$^{-1}$ are the enthalpy calculations at standard temperature and pressure.

Typically, the combustion/calcination reaction of step a) takes place in the range of 800° C. and 1350° C., on many occasions in the range of 900-1250° C., or in the range of 1000-1150° C. These ranges are preferred to balance the need to activate the endothermic calcination reaction of step a) with the desire to supply only the energy necessary to provide the reaction temperatures needed, thereby minimising energy wastage. It preferably that the temperature of the step a) is controlled to be at most 1250 or 1350° C. to avoid the formation of calcium silicates, for process operation reasons.

It is preferred that the carbon dioxide produced in step a) is sequestered, to make to process at least carbon neutral. The skilled person knows how to sequester carbon dioxide from a gas. As the flue gas from step a) comprises mainly water vapour and carbon dioxide, it is easy to separate the carbon dioxide by cooling the gas to condense the water vapour.

In order to sequester carbon dioxide, it is necessary to compress it to a supercritical state in a series of compression steps, which require a large amount of energy. Customarily, compression of carbon dioxide is achieved using electrically-driven compressors, which contributes to the carbon footprint and is also a financial burden. In one embodiment of the invention, heat energy produced from the combustion is step a) is used to compress the carbon dioxide generated in step a), as per step bii). This is done as part of the carbon dioxide sequestration process. By compress carbon dioxide, we mean increase the pressure of the carbon dioxide above atmospheric pressure. Preferably the pressure is increased until the carbon dioxide is in a supercritical state.

In another embodiment, the heat energy from step a) is used to drive a gas separation process (step bi).

An advantage of the process of the present invention, is that more energy is usually produced than is required to generate oxygen (as per step bi). Therefore, surplus energy is available to drive other processes within the system. For instance, some or all of the surplus energy could be used to compress carbon dioxide generated in step a) as per step bii). Accordingly, in a preferred embodiment, the heat energy from step a) is used to both separate oxygen from air and compress carbon dioxide.

Turning to the solid stream from step a), this will comprise the metal oxide generated by calcination of the carbonate fraction in reaction (ii) along with any other solids from the mineral that have not combusted, such as silica, alumina, iron oxide and trace metal oxides (Mn, Ti, Va, etc. in ppm quantities).

As stated above, some or all of the heat generated in step a) is used to drive a gas separation process which generates high purity oxygen from air, in step b) of the process of the present invention. By high purity oxygen we mean gas that is at least 90% by volume oxygen, preferably at least 95% by volume oxygen.

Typically, the gas separation process of step b) occurs in an Air Separation Unit (ASU), a Pressure Swing Adsorption (PSA) system or a Vacuum Swing Absorption (VSA) process. Preferably, the gas separation process of step b) takes place in a Pressure Swing Adsorption (PSA) system. Using PSA or VSA up to 95% oxygen purity is possible, whereas using ASU, 99.9% purity is possible. Typically VSA/PSA will produce (by volume) about 93% oxygen, about 4% argon, about 3% nitrogen and about 0.2% carbon dioxide.

In general, ASU, PSA and VSA systems are known to the skilled person. PSA and VSA are non-cryogenic gas separation technologies that operate on the basis of pressure differences and conventionally use electricity, which is a high value energy source, to drive a compressor. However, in the process claimed, oxygen can be separated from air using heat energy released from the process steps of the invention. For instance, the heat energy may be heat released on cooling of the products of the calcination process, namely the metal oxide and carbon dioxide, to ambient temperature. Alternatively, heat energy from a condensation process to extract carbon dioxide from water vapour may be used. As a result, a more energetically and economically favourable method of oxygen generation is achieved. A PSA system is particularly advantageous as such systems are more stable to fluctuations in energy supply.

ASU is a cryogenic gas separation method. Cryogenic gas separation is a mature gas technology used extensively by the industrial gas supply industry for the production of nitrogen, oxygen and argon. It involves cooling air to a very low temperature until each gas component is liquefied. They liquefy at different temperature, and can thereby be separated by distillation.

Further, oxygen generated in step b) is not wasted, as the oxygen generated is of high purity and is recycled into the combustion reaction of step a). Further, as oxygen has many industrial uses, any surplus oxygen generated can be removed and used for other industrial or commercial purposes.

In addition, the claimed process is advantageous over conventional oxy-fuel combustion (i.e. combustion of methane to generate heat, which is then converted to electricity), as a higher amount of pure carbon dioxide is generated per unit of oxygen. The combustion of methane liberates one mole of carbon dioxide, whereas the calcination of a group II metal oxide in conjunction with combustion of methane liberates four moles of carbon dioxide, such that an overall reaction mechanism between methane and calcium carbonate would be:

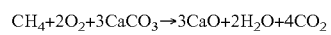

$$CH_4 + 2O_2 + 3CaCO_3 \rightarrow 3CaO + 2H_2O + 4CO_2$$

This results in sufficient energy being released by the combustion of a mol of methane (890 kJ/mol) to calcine three mols of calcium carbonate (at 178 kJ/mol each), having taken into account heat losses and inefficiencies of the system.

The gaseous mixture generated in step a) comprises carbon dioxide and water vapour. In order to generate high purity carbon dioxide, the gaseous mixture may be cooled, so that steam condenses out as liquid water. Carbon dioxide obtained after separation from water vapour is pure and is therefore suitable for direct sequestration without the need for additional purification or drying steps.

The process of the invention may also comprise an additional step d), wherein the metal oxide generated in step a) is hydrated to produce a metal hydroxide and heat. In such cases the reaction process of step d) would be:

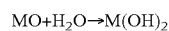

$$MO + H_2O \rightarrow M(OH)_2$$

The water of hydration may be the water vapour produced in step a), or it may be from another source. The water vapour generated in step a), which is not used in hydration of the metal oxide, will often be cooled and collected for use in other applications.

Hydration of a metal oxide is an exothermic reaction, generating heat energy. The heat energy generated in this additional step can be collected and put back into the system. Further, metal hydroxides have a wide range of uses in various different technical fields.

The metal oxides produced from combustion/calcination of the shale will be of a lower grade than commercial lime, as it will contain other mineral species (such as alumina, silica, and iron oxide etc.), but will be suitable for use for re-carbonation, or as an additional component in cement production, being similar in nature to blast furnace slags and coal fly ash (from power boilers).

It may also be possible to separate out particular oxides or hydroxides and use them separately. For example, calcium hydroxide may be used as a flocculent in the treatment of sewage water, to produce sodium hydroxide in the paper industry (the Kraft process) or in the dental industry, and magnesium hydroxide can be used in antacids, laxatives or antiperspirant.

Typically, the oxygen and/or carbon dioxide used in the combustion reaction of step a) has a purity of 90% or greater, often 95% or even 99% or greater. As mentioned previously, traditional calcination of limestone takes place by combustion of natural gas in air and the resulting flue gas from this process is a mixture of carbon dioxide and nitrogen gas. As such, to obtain carbon dioxide of sufficient purity for sequestration, separation of the mixture is required, which is both energy-intensive and costly. However, combustion of a the mineral in a mixture of high purity oxygen, high purity carbon dioxide and water vapour will result in a pure carbon dioxide product gas stream, allowing for the direct sequestration of carbon dioxide from step a). Therefore, there is no energy penalty resulting from the need to purify or concentrate the carbon dioxide prior to storage, as would be the case for carbon dioxide released from conventional flue gases from power plants or calcination processes. Furthermore, the advantage of capturing and storing carbon dioxide from the flue gas as a solid carbonate obviates the need for (i) 'conventional' carbon dioxide capture and compression (ii) the installation of a pipeline between the source of the carbon dioxide and the storage site (which may well be a considerable distance apart) (iii) pumping the carbon dioxide along the pipeline, (iv) injection of carbon dioxide into the geological formation, and (v) ongoing monitoring of the storage site.

According to a second aspect of the invention there is provided a use of the process of the first aspect of the invention in carbon dioxide sequestration. The sequestration techniques used will generally be conventional and well known to those skilled in the art. Often sequestration will be geological sequestration.

In a third aspect of the invention, there is provided a use of the first aspect of the invention in oxygen generation i.e. as per step bi). The oxygen generated is of sufficient purity for storage and use in further industrial or commercial applications, such as steel manufacture for example.

Unless otherwise stated, each of the integers described may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

As used herein, the term "pure", regardless of the substance to which it is applied, may mean that the substance has in the range 0% to 10% impurities, at most 5%, often in the range 0.0001% to 1%, or 0.001% to 0.5% impurities (i.e. it is 90% to 100% pure, often 95% to 99.9999% or 99.5% to 99.999% pure).

BRIEF DESCRIPTION OF THE DRAWINGS

In order that the present invention may be more readily understood, it will be described further with reference to the figures.

FIG. 1 is a schematic representation of a process according to the invention.

EXAMPLE

FIG. 1 shows an example of the process of the invention, comprising step a), in which shale oil is used as the mineral. The shale oil is milled and introduced into a preheater with a mixture of 80% recycled flue gasses and 20% high purity oxygen (93% pure).

When the mineral has been heated, it moves to the calciner, and is set alight and burnt.

During this process, the fuel fraction of the shale oil, i.e. the kerogen, combusts releasing carbon dioxide, water vapour and heat. The heat energy released is sufficient to drive the calcination reaction, meaning that the carbonate fraction, which is predominantly calcium carbonate, decomposes into a material that is predominantly calcium oxide along with any residual mineral which include silica, alumina and iron oxide.

The fuel gases are collected, and a portion is recycled back into the preheater with oxygen added. The remainder of the flue gases are processed, with the carbon dioxide generated being separated from water vapour, by cooling the water vapour, and then directly sequestered, resulting in a carbon neutral system.

The metal oxide generated is cooled to ambient temperature and the heat energy released is used to drive an oxygen separation process by a PSA system. The oxygen generated is be fed back into step a).

In addition, in step d), the metal carbonate generated in step a) is subsequently hydrated, forming metal hydroxide (for example slaked lime), which is an exothermic reaction. The energy released in the hydration can also be fed into the oxygen separation process.

In step b) air enters an air separation processing unit, such as a PSA, which is being operated predominantly using energy produced in step a), thereby minimising the electrical input required. In this unit, the air is separated to produce a predominantly nitrogen stream, and a predominantly oxygen stream, of high purity oxygen (at least 90% by volume). The high purity oxygen is used in step a). The water vapour and carbon dioxide used in step a) are recycled from step a) flue gasses.

Alternately, or usually in addition, heat from step a) is used to drive a compressor, which compresses the carbon dioxide produced in the flue gasses from step a) in the sequestration process.

What is claimed is:

1. A process comprising:
   (a) providing a mineral comprising a metal carbonate fraction and a fuel fraction, wherein the fuel fraction has a calorific value which is at least 50% of the energy needed to calcine the metal carbonate fraction, and combusting the mineral in the presence of oxygen, water vapour and carbon dioxide, to generate a metal oxide, water vapour, carbon dioxide and heat;
   wherein the mineral is combusted in a mixture of gases comprising 5 to 20% by volume water vapour, 15 to 25% by volume oxygen, and 60 to 75% by volume carbon dioxide.

2. A process according to claim 1, wherein the fuel fraction of the mineral has a calorific value which is sufficiently high to enable to calcination of the entire carbonate fraction.

3. A process according to claim 1, wherein the mineral is oil shale or coal shale.

4. A process according to claim 1, wherein the metal carbonate fraction of the mineral comprises a group II metal, or a combination of group II metals.

5. The process according to claim 1, the process further comprising:
   (b) for using the gene rated heat to:
      (i) drive a gas se tion process which generates high purity oxygen from air, wherein the generated high purity oxygen is used in step (a); and/or
      (ii) compress the carbon dioxide generated in step (a).

6. A process according to claim 1, wherein the mixture of gases in which the mineral is combusted comprises nitrogen at a level of 0 to 1% by volume of the gases.

7. A process according to claim 1, wherein the mixture of gases in which the mineral is combusted comprises flue gases recycled from step (a) and oxygen.

8. A process according to claim 1, wherein the combustion/calcination reaction takes place in the range of 800 to 1350° C.

9. A process according to claim 5, wherein the gas separation process of step (b)(i) occurs in a system selected from the group consisting of an Air Separation Unit (ASU), a Pressure Swing Adsorption (PSA) System, and a Vacuum Swing Absorption (VSA) process.

10. A process according to claim 9, wherein the gas separation process of step (b)(i) occurs in a Pressure Swing Adsorption (PSA) system.

11. A process according to claim 1, the process further comprising an additional step of sequestering the generated carbon dioxide.

12. A process according to claim 11, wherein the heat generated is used to both (i) drive a gas separation process which generates high purity oxygen from air and (ii) compress the generated carbon dioxide, in the process of sequestering the carbon dioxide.

13. A process according to claim 5, further comprising an additional step of causing hydration of the generated metal oxide to produce a metal hydroxide and heat.

14. A process according to claim 13, wherein the heat generated during hydration of the metal oxide is used to drive the generation of high purity oxygen and/or the compression of the carbon dioxide.

15. A process according to claim 1, wherein the oxygen and/or carbon dioxide used in the combustion reaction is at least 90% pure.

16. Use of a process according to claim 1 in carbon dioxide sequestration.

17. Use of a process according to claim 1 in oxygen generation.

* * * * *